United States Patent Office 2,999,827
Patented Sept. 12, 1961

2,999,827
EPOXY COATING COMPOSITIONS
Charles W. McGary, Jr., and Charles T. Patrick, Jr.,
South Charleston, W. Va., assignors to Union Carbide
Corporation, a corporation of New York
No Drawing. Filed Jan. 21, 1959, Ser. No. 788,038
45 Claims. (Cl. 260—23)

This invention relates to compositions comprising polymerizable compositions, partially cured and cured resinous compositions. In a particular aspect, this invention is directed to compositions based on cyclohexene oxide-fatty acid esters which have been found to be especially adapted for use as protective coatings, and to methods for their preparation.

One of the largest outlets in the coatings field for conventional epoxy resins is in ester or varnish-type coatings. In these materials the epoxy resin is used as a high molecular weight polyol and is esterified with various fatty acids. Conventional epoxy resins are generally polymeric polyglycidyl ethers of polyhydric phenols. Polyepoxides of this type usually have molecular weights ranging from about 1000 to 8000. Esterification presumably occurs at both epoxide and hydroxyl sites. Esterification of hydroxyl groups is the major reaction since epoxy groups are only present in small quantity. Esterification of the hydroxyl groups with fatty acids requires fairly vigorous conditions, i.e., a temperature in the range between 230° C. and 260° C. and many unsaturated fatty acids, such as tung oil acid, form gels under these conditions.

Drying-oil esters based on the commercial epoxides employed as protective coatings have found wide acceptance due to their outstanding caustic and water resistance, and toughness and flexibility as compared to other drying oil compositions employed as protective coatings. These coatings, however, have been limited to certain areas of application due to various disadvantages such as poor color retention on exposure to ultraviolet light, severe chalking on exposure to outdoor conditions, poor solubility in inexpensive solvents, and relatively high cost.

Accordingly, one or more of the following objects will be achieved by the practice of this invention.

It is a main object of this invention to provide novel epoxy-fatty acid ester compositions especially adapted for protective coating applications, and to provide methods for their preparation.

It is another object of this invention to provide novel drying and non-drying epoxy-fatty acid ester compositions which have excellent color retention in ultraviolet light and good solubility in inexpensive solvents, and which do not exhibit various disadvantages of fatty acid esters based on conventional epoxy resins.

Other objects and advantages of this invention will become apparent to those skilled in the art from the accompanying description and disclosure.

The compositions of this invention are based on novel epoxy-fatty acid esters comprising the products of reaction of (1) a polyepoxide containing at least two cyclohexene oxide groups, and (2) an aliphatic monocarboxylic acid in an amount sufficient to provide between about 0.3 and 0.7 carboxyl equivalents per epoxy equivalent of said polyepoxide.

By the term "cyclohexene oxide" is meant a group corresponding to the structure

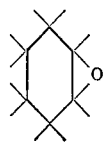

Among the compositions of this invention having outstanding utility are those based on epoxy-fatty acid esters comprising the products of reaction of (1) a polyepoxide characterized by the general formula

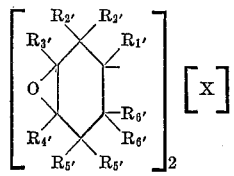

wherein X represents divalent radicals selected from the group consisting of $$\left[-CH_2O\overset{O}{\underset{\|}{C}}-\right]$$

$$\left[-CH_2O\overset{O}{\underset{\|}{C}}-R-\overset{O}{\underset{\|}{C}}OCH_2-\right]$$

and $$\left[-\overset{O}{\underset{\|}{C}}O-R'-O\overset{O}{\underset{\|}{C}}-\right]$$

wherein R represents a member selected from the group consisting of aliphatic and aromatic radicals, R' represents an aliphatic radical, and $R_1'$ through $R_6'$ are members selected from the group consisting of hydrogen and aliphatic radicals, and (2) an aliphatic monocarboxylic acid in an amount sufficient to provide between about 0.3 and 0.7 carboxyl equivalents per epoxy equivalent of said polyepoxide. Said epoxy-fatty acid esters have an oxirane oxygen content of at least 0.3 milliequivalents per gram.

The polymerizable compositions of this invention are based on mixtures comprising an epoxy-fatty acid ester as described above and a polymerization catalyst hereinafter more fully described.

The resinous compositions of this invention are derived from the polymerizable compositions by the application of heat and other polymerization conditions hereinafter more fully described.

By the term "epoxy equivalent" as used herein is meant the number of epoxy groups

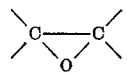

contained in a quantity of epoxide compound. For example, one mol of 3,4-epoxy-6-methylcyclohexylmethyl 3,4-epoxy-6-methylcyclohexanecarboxylate contains two epoxy equivalents.

By the term "carboxyl equivalent" as used herein is meant the number of carboxyl groups (—COOH) contained in a quantity of a carboxylic compound. For example, one mole of a monocarboxylic acid contains one carboxyl equivalent. In the case of a polycarboxylic acid anhydride, the term "carboxyl equivalent" is meant to indicate the number of carboxyl groups which would be contained by an amount of the corresponding polycarboxylic acid. Thus, for example, one mole of a dicarboxylic acid anhydride would have two carboxyl equivalents.

By the term "oxirane oxygen" is meant the oxygen contained as an epoxy group.

By the term "milliequivalent" is meant one thousandth part of the above-defined "equivalent" quantity.

The compositions of this invention can contain elements comprising nitrogen, silicon, phosphorus, sulfur and halogen in addition to carbon, hydrogen and oxygen.

A preferred class of polyepoxides characterized by the hereinbefore described general formula which are contemplated for use in preparing the novel compositions of this invention are the 3,4-epoxycyclohexylmethyl 3,4-epoxycyclohexanecarboxylates which have the formula

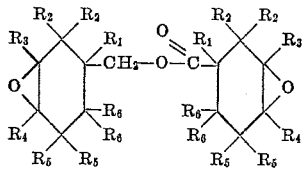

wherein $R_1$ through $R_6$ represent a hydrogen atom or a lower alkyl radical containing between one and four carbon atoms, and includes 3,4-epoxycyclohexylmethyl 3,4-epoxycyclohexanecarboxylate; 3,4-epoxy-1-methylcyclohexylmethyl 3,4 - epoxy - 1 - methylcyclohexanecarboxylate; 3,4 - epoxy - 2 - methylcyclohexylmethyl 3,4-epoxy - 2 - methylcyclohexanecarboxylate; 3,4 - epoxy-6-methylcyclohexylmethyl 3,4-epoxy-6-methylcyclohexanecarboxylate; 3,4-epoxy - 3 - methlcyclohexylmethyl 3,4-epoxy-3-propylcyclohexanecarboxlate; 3,4-epoxy-4-methylcyclohexylmethyl 3,4-epoxy - 4 - methylcyclohexanecarboxylate; 3,4-epoxy-1-methylcyclohexylmethyl; 3,4-epoxy-5-ethylcyclohexanecarboxylate, and the like.

Another preferred class of polyepoxides contemplated for use in preparing the novel compositions of this invention are dihdric alcohol bis(3,4-epoxycyclohexanecarboxylates) which correspond to the formula

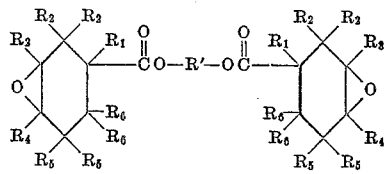

wherein $R_1$ through $R_6$ represent a hydrogen atom or a lower alkyl radical containing between one and four carbon atoms, and $R'$ represents an aliphatic radical containing between two and about twenty carbon atoms.

The term "aliphatic" radical as represented by $R'$ is meant to include structures which are derived from polyethylene glycols having the formula

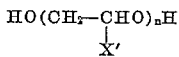

wherein $X'$ represents a member selected from the group consisting of hydrogen and methyl groups and $n$ represents a positive integer in the range of from 2 through 10. Illustrative of this group of polyepoxides are ethylene glycol bis(3,4 - epoxycyclohexanecarboxylate); 2-ethyl-1,3-hexanediol bis(3,4-epoxycyclohexanecarboxylate); diethylene glycol bis-(3,4 - epoxy-6-methylcyclohexanecarboxylate); 3-methyl-1,5-pentanediol bis(3,4-epoxy-6-methylcyclohexanecarboxylate); 1,5-pentanediol bis(3,4-epoxy-1-methylcyclohexanecarboxylate); tripropylene glycol bis(3,4-epoxy-2-ethylcyclohexanecarboxylate); 1,6-hexanediol bis-(3,4-epoxycyclohexanecarboxylate); 1,2-eicosanediol bis-(3,4-epoxycyclohexanecarboxylate), and the like.

Another preferred class of polyepoxides contemplated for use in preparing the novel compositions of this invention are the bis(3,4-epoxycyclohexylmethyl)dicarboxylates corresponding to the formula

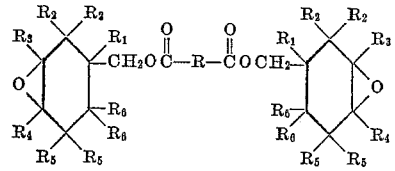

wherein $R_1$ through $R_6$ represent a hydrogen atom or a lower alkyl radical containing between one and four carbon atoms, and R represents a member selected from the group consisting of aliphatic radicals containing between zero and about twenty carbon atoms and aromatic hydrocarbon radicals containing between six and about twenty carbon atoms. Illustrative of this group of polyepoxides are bis(3,4-epoxycyclohexylmethyl) maleate; bis(3,4-epoxycyclohexylmethyl) pimelate; bis(3,4-epoxy-6-methylcyclohexylmethyl) maleate; bis(3,4-epoxy-6-methylcyclohexylmethyl) succinate; bis(3,4-epoxy-6-propylcyclohexylmethyl) sebacate; bis(3,4-epoxy-4-methylcyclohexylmethyl) 1,2-octadecanedicarboxylate; bis(3,4-epoxycyclohexylmethyl) terephthalate; bis(3,4-epoxy-1-butylcyclohexylmethyl) 1,4-naphthalenedicarboxylate, and the like.

The polyepoxide starting materials are readily prepared by peroxidation of the corresponding olefinic derivatives. Preferred classes of polyepoxide starting materials and methods for their preparation are described in detail in United States Patents Nos. 2,716,123, 2,745,847, and 2,750,395.

Aliphatic monocarboxylic acids which are suitable for use in preparing the novel compositions of this invention are the saturated and unsaturated monocarboxylic acids containing between three and about twenty-two carbon atoms. Preferred aliphatic monocarboxylic acids include hexanoic acid, caprylic acid, lauric acid, capric acid, myristic acid, palmitic acid, stearic acid, arachidic acid, palmitoleic acid, oleic acid, linoleic acid, linolenic acid, eleostearic acid, licanic acid, ricinoleic acid, hexenoic acid, hexadienoic acid, octenoic acid, and the like. It is advantageous for purposes of economy to employ mixtures of acids, particularly those derived from natural sources such as castor oil, dehydrated castor oil, coconut oil, cottonseed oil, linseed oil, oiticaca oil, perilla oil, olive oil, safflower oil, sardine oil, soybean oil, tall oil, tung oil (Chinawood oil), and the like.

The novel epoxy-fatty acid esters are prepared by interaction of the aliphatic monocarboxylic acid with the cyclohexene oxide derivative in specific proportions at a temperature between about 25° C. and 250° C. for a reaction period which can vary from several minutes to several days depending on such factors as the reaction temperature, the concentrations and reactivities of the reactants, and the presence or absence of a catalyst. Most of the reactions will proceed to completion at a temperature between about 100° C. and 220° C. in a reaction time between about 0.5 and 10 hours. Various acids and bases can be employed to catalyze the reactions although such measures are generally unnecessary. The catalyst is used in a quantity between about 0.005 and 5 weight percent based on the total weight of the fatty acid and polyepoxide reactants. Suitable catalysts include acids such as sulfuric acid, alkanesulfonic acids, benzenesulfonic acid, toluenesulfonic acid, phosphoric acid, polyphosphoric acid, dimethyldihydrogenpyrophosphate, and the like; bases such as sodium hydroxide, sodium alcoholates, and the like; quaternary ammonium compounds such as benzyltrimethylammonium hydroxide, tetramethylammonium hydroxide, and the like; and tertiary amines such as alpha-methylbenzyldimethylamine, pyridine, triethylamine, dimethylaminomethylphenol, 2,4,6-tris(dimethylaminomethyl)phenol, and the like.

The proportions of polyepoxide and aliphatic monocarboxylic acid interacted are conveniently expressed in terms of carboxyl equivalents of the fatty acid per epoxide equivalent of the polyepoxide. A suitable ratio is in the range between about 0.3 and 0.7 carboxyl equivalents per epoxide equivalent, and the preferred ratio is between about 0.35 and 0.6 carboxyl equivalents per epoxide equivalent. Theoretically, in the case where the polyepoxide being reacted is a diepoxide, 0.5 carboxyl equivalent per epoxide equivalent should afford desirable monoepoxy fatty acid ester product. For example, such a reaction proceeds as follows:

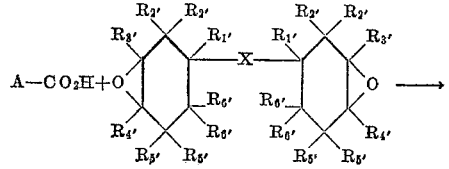

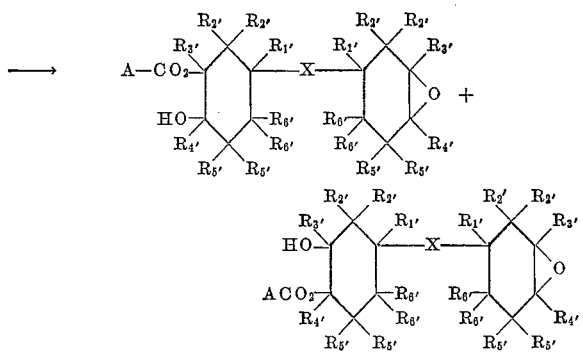

wherein X and $R_{1'}$ through $R_{6'}$ are as previously defined, and A is an aliphatic radical containing between two and about twenty-one carbon atoms. The interaction of fatty acid and polyepoxide proceeds substantially in this manner; however, the reaction product usually contains impurities from the starting materials as well as varying amounts of products derived from epoxide-hydroxyl interaction and epoxide homopolymerization. The loss of epoxy groups to side-reactions permits less than the theoretical 0.5 carboxyl equivalents per epoxy equivalent of the diepoxide to be employed in producing optimum yields of the desired monoepoxy ester adduct. The completion of the fatty acid and polyepoxide interaction is readily determined by analytical sampling of the reaction mixture during the reaction course to determine the quantity of unreacted fatty acid.

In accordance with the above illustrated reaction scheme, preferred epoxy-fatty acid esters of this invention comprise substantially material characterized by the general formula

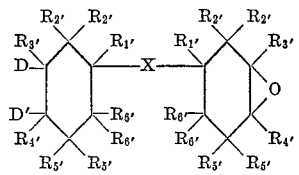

wherein X and $R_{1'}$ through $R_{6'}$ are as defined previously, and wherein D and D' are members selected from the group consisting of (—OH) and ($ACO_2$—) radicals with the proviso that one of said D and D' is (—OH) and the other is ($ACO_2$—), and A is an aliphatic radical containing between two and about twenty-one carbon atoms.

Because the presence of epoxide groups is essential in the fatty acid-polyepoxide ester product, it is convenient to characterize the ester product as containing at least 0.3 milliequivalents of epoxide per gram, and preferably containing between about 0.4 and 5.0 milliequivalents of epoxide per gram of ester product.

If desired, a solvent may be used as a medium for the fatty acid and polyepoxide interaction to facilitate stirring, to control reaction temperature and the rate of reaction, and the like. Suitable solvents include aromatic hydrocarbons, e.g., benzene, toluene, xylene, and the like; aliphatic hydrocarbons, e.g., hexane, heptane, terpene solvents, cyclohexane, and the like; oxygenated solvents, e.g., ethyl acetate, butyl acetate, amyl acetate, acetone, methyl ethyl ketone, methyl isobutyl ketone, cyclohexanone, tetrahydrofuran, Cellosolve, methyl Cellosolve, dioxane, diisopropyl ether, and the like; and other common solvents. The epoxy-fatty acid ester product mixtures can be employed in applications without purification or modification. If desired, separation of the adduct product mixture into its component parts can be accomplished by distillation.

As mentioned previously, the polymerizable compositions of this invention comprise mixtures of the novel epoxy-fatty acid esters described hereinabove and a catalytic quantity of an active polymerization agent. The quantity of catalyst employed can vary in the range between about 0.005 and 15 weight percent based on the total weight of the polymerizable material in a composition, with between about 0.01 and 10 weight percent being the preferred weight range. Suitable polymerization catalysts include acids such as sulfuric acid, alkanesulfonic acids, benzenesulfonic acid, perchloric acid, phosphoric acids, and the like; metal halide Lewis acids and their complexes, such as stannic chloride, stannic bromide, ferric chloride, aluminum chloride, zinc chloride, boron trifluoride, boron trifluoride-ether complexes, boron trifluoride amine complexes, e.g., boron trifluoride-monoethylamine complex, boron trifluoride-piperidine complex, and the like; bases such as sodium hydroxide, alkali metal alcoholates, tertiary amines, e.g., benzyldimethylamine, dimethylaminomethylphenol, 2,4,6-tri(dimethylaminomethyl)-phenol, and the like; alkyl titanates such as tetraisopropyl titanate, tetrabutyl titanate, and the like; and other similar catalysts having curing activity. Preferred catalysts are the acidic catalysts and the alkyl titanates. The particularly preferred catalysts from this group include stannic chloride, stannic bromide, boron trifluoride-etherate, boron trifluoride-amine complexes, metal fluoboroxates, e.g., zinc fluoborate, copper fluoborate, lead fluoborate, and tetralkyl titanates, e.g., tetraisopropyl titanate and tetrabutyl titanate.

The polymerizable compositions comprising an epoxyfatty acid ester and a polymerization catalyst can be prepared by the simple expediency of mixing together the composition components at room temperature. The polymerizable compositions can be prepared at the time that they are to be utilized or they can be prepared and stored for future application. The incorporation of the catalyst into the polymerizable compositions can be facilitated if desired by preparing a catalyst solution with a suitable solvent such as xylene, ethyl acetate, heptane, dioxane, ethyl ether and the like. Small quantities of water can be used as a solvent with most of the catalysts with the exception of those which decompose in water, e.g., aluminum chloride.

The resinous compositions of this invention are readily obtained from the polymerizable compositions by the application of heat. The curing, i.e., polymerization, occurs readily with or without a solvent at a temperature in the range between about 25° C. and 200° C. The polymerization time can vary over a wide range from several minutes to several days depending on such factors as the nature of the epoxy-fatty acid ester, the quantity and reactivity of the catalyst, the absence or presence of a solvent, and the like. It is advantageous to perform the polymerization in a solvent or solvent mixture. Suitable solvents include hydrocarbons such as benzene, xylene, toluene, hexane, heptane, octane, cyclohexane and various terpenes; oxygenated solvents such as acetone, methylisobutyl-ketone, cyclohexanone, ethyl acetate, butyl acetate, amyl acetate, dioxane, tetrahydrofuran, dibutyl ether, and the like; and other common solvents such as carbon tetrachloride, carbon disulfide, and the like. The progress of the polymerization reaction can be observed by determining the relative viscosity of samples drawn from the reaction mixture. In this manner it is possible to produce partially polymerized compositions or completely polymerized compositions. The presence of solvent permits the maintenance of adequate stirring, and it provides a medium for applying the final resinous material in coatings and other applications.

The resinous compositions i.e., the polymerized and partially polymerized epoxy-fatty acid ester compositions of this invention, can also be obtained directly from the fatty acid and polyepoxide starting materials employed to prepare the epoxy-fatty acid esters. The fatty acid and polyepoxide are dissolved in a solvent in proportions providing between about 0.3 and 0.7 carboxyl equivalents per epoxide equivalent with a quantity of catalyst between about 0.005 and 15 weight percent and heated at a temperature between 25° C. and 220° C. for a period of time sufficient to provide a polymerized composition, said polymerized composition comprising a solution of resinous material which is substantially the homopolymer of the epoxy-fatty acid ester formed in situ as an intermediate. The catalyst must be employed in sufficient quantity and have the proper reactivity to catalyze both the formation of the intermediate epoxy-fatty acid ester adduct mixture and the subsequent polymerization of the intermediate mixture. The reaction conditions for this single-step process can be varied over the broad ranges described above, and the properties of the final resinous product will vary with the changes in reaction conditions.

It is believed that the polymerization of an epoxy-fatty acid ester proceeds by more than one mechanism to produce a complex resinous product. The main reaction course can be visualized as proceeding in the following manner:

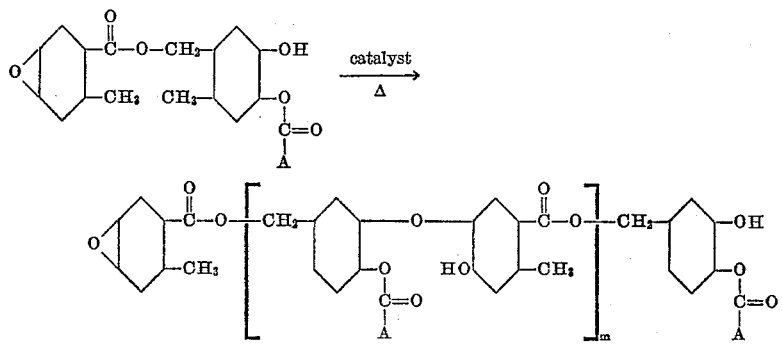

The epoxide groups are also capable of reacting with each other as well as with hydroxyl groups. These postulated reaction mechanisms are merely theoretical; other theories or reasons may equally well explain the true course of the polymerizations.

Epoxy-fatty acid ester compositions which are prepared from a polyepoxide and a fatty acid in a ratio of less than about 0.3 carboxyl equivalents of fatty acid per epoxy equivalent of polyepoxide, are susceptible to gelation under polymerization conditions due to the presence of a relatively large number of residual epoxy groups in the epoxy-fatty acid ester compositions. Epoxy-fatty acid esters which are prepared from a polyepoxide and a fatty acid in a ratio of more than about 0.7 carboxyl equivalents per epoxy equivalent, tend to polymerize to lower molecular weight materials due to a smaller number of residual epoxy groups in the epoxy-fatty acid ester composition which are available for polymerization.

The epoxy-fatty acid esters of this invention are generally viscous liquids having viscosities in the range between about 1,000 and 500,000 centipoises at 25° C. and are further characterized as having acid numbers of less than 10 and containing at least 0.3 milliequivalent of epoxide per gram of the epoxy-fatty acid ester.

The polymerized compositions of this invention are generally obtained as viscous solutions which have viscosities at 25° C. ranging from about 50 to 1,000,000 centipoises when measured as 50 percent solutions. The polymerized compositions fall into two general categories: (1) drying compositions, and (2) non-drying compositions. The drying compositions are those in which the fatty acid ester moiety contained in the resin is olefinically-unsaturated, e.g., the ester moiety derived from the interaction of dehydrated castor oil acid and a polyepoxide. The non-drying compositions are those in which the fatty acid ester moiety contained in the resin is saturated, e.g., the ester moiety derived from the interaction of hexanoic acid and a polyepoxide.

Both the drying and non-drying polymer compositions are useful as modifiers for coating resins such as phenol-formaldehyde resins, melamine-formaldehyde resins, alkyd resins, and the like. The compositions are outstanding as modifiers because (1) they have a wide range of compatibility, (2) they impart improved caustic, water and chemical resistance to the resin coatings they are modifying, (3) they impart improved flexibility and toughness, and (4) they impart improved color stability to ultraviolet light exposure.

The drying polymer compositions of this invention are capable of "drying," or curing, to excellent protective coatings with or without the use of elevated temperatures. It is generally desirable to employ various metallic salts of organic compounds, which are known as driers, to accelerate the drying process. The drying can be accomplished at temperatures in the range between about 10° C. and 250° C. for a period of time sufficient to produce the desired properties in the resin. The drier compound is employed in a quantity between about 0.001 and 5.0 weight percent, based on the weight of polymer. Suitable driers include soluble compounds containing heavy metals, e.g., cobalt, lead, manganese, calcium, zinc, iron, and the like. Examples of such driers include cobalt naphthenoate, lead octanoate, and the like. The drying compositions can be treated in the various ways familiar to the varnish and paint industry to produce special or advantageous effects. For example, they can be heat-bodied to improve viscosity characteristics or chemically-bodied by reacting with such compounds as maleic anhydride or dicyclopentadiene.

The cyclohexene oxide polyepoxides reacted with fatty acids to prepare the epoxy-fatty acid esters of this invention have the advantage of exceptionally high reactivity toward fatty acids. This permits the preparation of polymers having extremely low acid numbers which aids in any subsequent pigmentation of the polymers and also leads to coatings with improved caustic resistance. The high reactivity of the polyepoxides also allows the use of heat-sensitive fatty acids such as tung oil acid which usually leads to a gel when employed for esterification of conventional polyepoxide resins. Coatings of this invention derived from such heat-sensitive fatty acids display outstanding toughness, flexibility, chemical resistance, and they dry or cure extremely fast.

In another embodiment of this invention, valuable epoxy-fatty acid esters, and polymerizable and polymerized compositions produced therefrom, can be prepared according to the hereinabove described methods by the use of a polyepoxide starting material containing three cyclohexene oxide groups, or four cyclohexene oxide groups. One preferred class of polyepoxides containing three cyclohexene oxide groups is that characterized by the formula

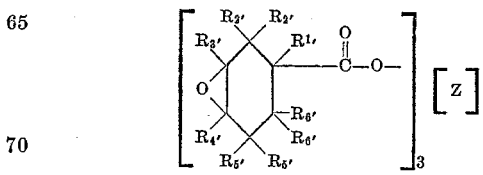

wherein $R_1'$ through $R_6'$ represent hydrogen or aliphatic radicals, and Z is a trivalent aliphatic radical. Illustrative of these preferred polyepoxides are the compounds corresponding to the esters of 3,4-epoxycyclohexanecarboxylic acids with trihydric alcohols such as glycerol, 1,2,6-hexanetriol, 1,1,1-trimethylolpropane, trimethylolmethane, and the like. Suitable polyepoxides containing three cyclohexene oxide groups and methods for their preparation are disclosed in United States Patent No. 2,857,402 to Phillips and Starcher.

One preferred class of polyepoxides containing four cyclohexene oxide groups is that characterized by the formula

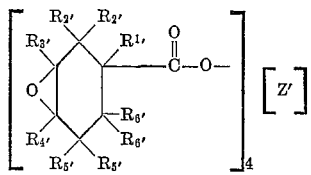

wherein $R_1'$ through $R_6'$ represent hydrogen or aliphatic radicals, and $Z'$ is a tetravalent aliphatic radical. Representative tetravalent aliphatic radicals as characterized by $Z'$ include groups which may be regarded as being the residue of tetrahydric (alcohols) without the hydroxyl groups. Examples of such tetrahydric (alcohols) include aliphatic tetraols such as erythritol, pentaerythritol 1,2,3,4-tetrahydroxypentane, 1,2,3,5-tetrahydroxypentane, 1,2,5,6 - tetrahydroxyhexane, 2,3,4,5 - tetrahydroxyhexane, 1,3,4,5-tetrahydroxyhexane, 1,3,4,6 - tetrahydroxyhexane, 1,2,7,8-tetrahydroxyoctane, 2,5 - dimethyl-2,3,4,5-tetrahydroxyhexane, 1,2,4,5 - tetrahydroxycyclohexane, 1,2,5,6-tetrahydroxycyclooctane, 1,2,3,4 - tetrahydroxycyclopentane, 9,10,12,13-tetrahydroxyoctadecanoic acid, and the like.

The polyepoxides containing four cyclohexene oxide groups corresponding to the above formula can be prepared by treating a tetraol tetrakis(3-cyclohexenecarboxylate) starting material with a peroxidizing agent. The tetraol tetrakis(3-cyclohexenecarboxylate) starting materials can be prepared in accordance with known procedures by condensing a 3-cyclohexenecarboxylic acid with an organic tetraol. The various organic tetraols and polyols which may be used to prepare the starting materials include aliphatic polyols, such as erythritol, threitol, pentaerythritol 1,2,3,4-tetrahydroxypentane, and the other tetraols mentioned above. Suitable polyepoxides containing four cyclohexene oxide groups and methods for their preparation are disclosed in co-pending patent application by S. W. Tinsley and P. S. Starcher, Serial No. 762,238, filed September 22, 1958, entitled, "Tetraepoxides and Polyepoxides."

Epoxy-fatty acid esters prepared by the interaction of fatty acids containing three, four or more cyclohexene oxide groups preferably should average at least one fatty-acid ester group and at least one unreacted cyclohexene oxide group per molecule. Resinous compositions can be prepared by the polymerization of these epoxy-fatty acid esters which exhibit extreme hardness and toughness.

By mention of the references hereinabove, pertinent material contained in these references are made part of the instant specification.

The preferred polyepoxide starting materials contemplated for the preparation of the compositions of this invention are more generally characterized by the formula

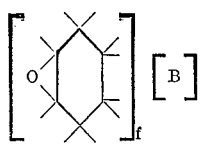

wherein B is a polyvalent organic radical containing between one and about forty carbon atoms and $f$ is an integer which has a value of at least 2 and not more than about 8. Besides the classes of polyepoxides disclosed hereinbefore, other preferred polyepoxides corresponding to the above general formula include carbonate epoxy esters such as 3,4-epoxycyclohexylmethyl carbonate, and the like; epoxy ethers of glycols and alkylene glycols such as 3,4-epoxycyclohexylmethyl ethers of ethylene glycol, 3,4-epoxy-6-methylcyclohexylmethyl ethers of polyethylene glycol and polypropylene glycol, and the like; and other derivatives such as 1,2-bis(3,4-epoxy-1-chlorocyclohexyl) ethane, 1,4-bis(3,4-epoxycyclohexylmethyl)-benzene, and the like.

In another embodiment of this invention, polymerizable compositions having utility in the fields of coating, laminating, bonding, molding, potting, calendering and the like, can be prepared from the novel epoxy-fatty acid esters by admixing them with various reactive hardening agents. The resinous compositions derived by the polymerization of the admixtures are essentially copolymers of the hardening agent and the epoxy-fatty acid ester. The hardening agent, or comonomer, can be any polyfunctional material capable of reaction with epoxide and/or hydroxyl groups to form polymers having the outstanding properties inherent in the resins of this invention. Such polyfunctional materials include polyepoxides, polycarboxylic acids, polycarboxylic acid anhydrides, polycarboxylic acid halides, polyhydric alcohols and phenols, polythiols, polyisocyanates, polyfunctional amines, polyamides, urea-formaldehyde adducts, melamine-formaldehyde adducts, phenol-formaldehyde adducts, and the like. The resinous compositions are prepared from the polymerizable compositions by the application of heat. The copolymerization of the polymerizable compositions of epoxy-fatty acid esters and hardening agents can be accomplished simultaneously with the preparation of the epoxy-fatty acid ester by forming the epoxy-fatty acid in situ from the polyepoxide and fatty acid starting materials, or after the preparation of the epoxy-fatty acid ester in the same manner as described above for the homopolymer compositions. Illustrative of useful polymerizable compositions and polymerized resinous copolymer compositions are the following:

(1) Polymerizable and polymerized compositions can be prepared from admixtures which comprise (a) an epoxy-fatty acid ester comprising the products of reaction of a polyepoxide containing at least two cyclohexene oxide groups with an alpihatic monocarboxylic acid in an amount sufficient to provide between about 0.3 and 0.7 carboxyl equivalents per epoxy equivalent, and (b) a polyfunctional amine, i.e., an amine having at least two active amino hydrogen atoms which can be on the same nitrogen atom or different nitrogen atoms, in an amount sufficient to provide between about 0.2 to 4.0 amino hydrogen atoms per epoxy group of said epoxy-fatty acid ester, and preferably between about 0.5 and 2.0 amino hydrogen atoms per epoxy group. Suitable polyfunctional amines include monoamines, diamines, triamines and higher polyamines such as 2-ethylhexylamine, aniline, phenethylamine, cyclohexylamine, 2-aminophenol, 1,3 - diamino - 2-propanol, ethylenediamine, butylenediamine, xylylenediamine, hexamethylenediamine, diethylenetriamine, triethylenetetramine, dipropylenetriamine, m-phenylenediamine, p-phenylenediamine, quanidine, p,p'-sulfonyldiamine, p,p'-methylenedianiline, bisaniline-F, and the like. The polyfunctional amines can be prereacted with epoxy compounds in greater than equivalent proportions to produce modified hardeners with amine end groups. This method permits the use of low-boiling amines which otherwise might be too volatile. Suitable modifier epoxy compounds include ethylene oxide, propylene oxide, butadiene dioxide, soybean oil epoxide, safflower oil epoxide, glycidyl ethers and the like. Other suitable modified amine hardeners are prepared by the condensation of a polyfunctional amine with an unsaturated compound, e.g., the condensation of diethylene-triamine with acrylonitrile. Catalysts suitable for polymerizing the admixtures of amines and epoxy-fatty acid ester adducts include alcohols, phenols and metal halide Lewis acid-amine complexes such as piperidine-boron trifluoride, and monoethylamine-boron trifluoride. The catalyst concentration can range from about 0.05 to 10 weight percent based on the total weight of polymerizable components in an admixture. The polymerization reaction can be performed with or without a catalyst, as desired.

(2) Polymerizable and polymerized compositions can be prepared from admixtures which comprise (a) an epoxy-fatty acid ester comprising the products of reaction of a polyepoxide containing at least two cyclohexene oxide groups with an aliphatic monocarboxylic acid in an amount sufficient to provide between about 0.3 and 0.7 carboxyl equivalents per epoxy equivalent, (b) a polycarboxylic acid in an amount having $y$ carboxyl equivalents of acid per epoxy equivalent of said epoxy-fatty acid ester, and (c) a polycarboxylic acid anhydride in an amount having $x$ carboxyl equivalents of anhydride per epoxy equivalent of said epoxy-fatty acid ester, wherein $y$ is a number in the range from about 0.3 to 3.0, $x$ is a number in the range from 0.0 to about 1.5, the sum of $y+x$ is not greater than about 3.0, and $x/y$ is less than 1.0.

Illustrative polycarboxylic acids which can be employed include aliphatic, aromatic and cycloaliphatic polycarboxylic acids such as oxalic acid, malonic acid, glutaric acid, maleic acid, suberic acid, citraconic acid, 1,2-cyclohexanedicarboxylic acid, phthalic acid, 1,8-naphthalenedicarboxylic acid, 3-carboxycinnamic acid, 1,2,4-hexanetricarboxylic acid, 1,2,4-benzenetricarboxylic acid and the like; polycarboxy polyesters, i.e, polyesters containing more than one carboxy group per molecule, such as polycarboxylic acids of the type exemplified above, or the corresponding anhydrides, esterified with polyhydric alcohols which include ethylene glycol, diethylene glycol, triethyleneglycol, tetraethylene glycol, propylene glycol, 1,6-hexanediol, trimethylolpropane, pentaerythritol, dimethylolphenol, inositol, poly(vinyl alcohols) and the like.

Polycarboxylic acid anhydrides which can be employed as modifiers include the anhydrides of maleic acid, chloromaleic acid, dichloromaleic acid, succinic acid, citraconic acid, itaconic acid, alkyl succinic acids, alkenyl succinic acids, phthalic acid, tetrahydrophthalic acid, methyltetrahydrophthalic acid, hexahydrophthalic acid, chlorendic acid, glutaric acid, adipic acid, sebacic acid, and the like. It will be noted that the polycarboxylic acid is a major component of the admixture Catalysts which are effective in accelerating the curing of the admixtures include acids such as sulfuric, perchloric, polyphosphoric, benzenesulfonic acid, toluenesulfonic acid and the like. Also included are the metal halide Lewis acids, e.g., boron trifluoride, stannic chloride, zinc chloride, ferric chloride, aluminum chloride and the complexes of these acids, such as boron trifluoride-ether complex, boron trifluoride-piperidine complex, boron trifluoride-monoethylamine complex, boron trifluoride-1,6-hexanediamine complex and the like. Catalysts concentrations can vary over the range from 0.001 to 5.0 weight percent based on the weight of polymerizable material.

(3) Polymerizable and polymerized compositions can be prepared from admixtures which comprise (a) an epoxy-fatty acid ester comprising the products of reaction of a polyepoxide containing at least two cyclohexene oxide groups with an aliphatic monocarboxylic acid in an amount sufficient to provide between about 0.3 and 0.7 carboxyl equivalents per epoxy equivalent, (b) a polycarboxylic acid anhydride in an amount having $x$ carboxyl equivalents of anhydride per epoxy equivalent of said epoxy-fatty acid ester adduct, and (c) a modifier compound in an amount having $m$ active hydrogen equivalents of modifier compound per epoxy equivalent of said epoxy-fatty acid ester, wherein $x$ is a number in the range from about 0.2 to 4.0, preferably from about 0.5 to 2.0, $m$ is a number in the range from about 0.0 to 1.0, the sum of $x+m$ is not greater than 4.0 and $x/m$ is at least 1.0. Suitable polycarboxylic acid anhydrides are exemplified by those listed in section (2) above. The preferred active hydrogen modifier compounds are polycarboxylic acids and polyhydric alcohols and phenols. Illustrative of the preferred active hydrogen modifier compounds are ethylene glycol, glycerol, pentaerythritol, inositol, poly(vinyl alcohol), trimethylolphenol, resorcinol, hydroquinone, polyhydric phenolformaldehyde condensation products, oxalic acid, maleic acid, itaconic acid, phthalic acid, 1,1,5-pentanetricarboxylic acid, azelaic acid, malic acid and the like. Other active hydrogen compounds useful as modifiers can be prepared by the condensation of polyols with dicarboxylic acid anhydrides in such proportions required to give polyesters with carboxyl and hydroxyl end groups. These esters can be prepared from the above-listed anhydrides or acids and polyols such as ethylene glycol, diethylene glycol, triethylene glycol, tetraethylene glycol, propylene glycol, 1,6-hexanediol, glycerol, 1,2,6-hexanetriol, trimethylolpropane, pentaerythritol, trimethylolphenol, inositol, poly(vinyl alcohol), and the like. Any one or combination of the three types of modifiers can be employed. It will be noted that the polycarboxylic acid anhydride is a major component of the admixtures. Catalysts which are effective in accelerating the anhydride-epoxide reactions of this invention include acids, such as sulfuric acid, perchloric acid, phosphoric acid, polyphosphoric acid, benzenesulfonic acid, toluenesulfonic acids, and the like; metal halide Lewis acids, such as boron trifluoride, stannic chloride, zinc chloride, ferric chloride, aluminum chloride and the complexes of such acids, e.g., boron trifluoride-ether complex, boron trifluoride-piperidine complex, boron trifluoride-monoethylamine complex, boron trifluoride-1,6-hexanediamine complex, and the like; basic catalysts, such as the alkali metal hydroxides, e.g., sodium and potassium hydroxides, and amines, e.g.. pyridine, alphamethylbenzyldimethylamine, dimethylaminoethylphenol, 2,4,6-tris(dimethylaminomethyl)phenol, triethylamine, trimethylammonium hydroxide, and the like. Catalyst concentrations can vary over the range from 0.001 to 5.0 weight percent based on the total weight of polymerizable material.

(4) Polymerizable and polymerized compositions can be prepared from admixtures comprising (a) an epoxy-fatty acid ester comprising the products of reaction of a polyepoxide containing at least two cyclohexene oxide groups with an aliphatic monocarboxylic acid in an amount sufficient to provide between about 0.3 and 0.7 carboxyl equivalents per epoxy equivalent, and (b) a polyol, i.e., an organic compound having at least two hydroxyl groups which are alcoholic hydroxyl groups, phenolic hydroxyl groups, or both alcoholic and phenolic hydroxyl groups, e.g., aliphatic and cycloaliphatic polyalcohols, and polyhydric phenols. The polyol is employed in an amount which provides between about 0.2 and 4.0 hydroxyl equivalents per epoxy equivalent of said fatty acid ester. These compositions can be further modified by incorporating therein a polycarboxylic acid compound or polycarboxylic acid anhydride such as those illustrated in section (2) above. It is pointed out that the polyol is a major component as compared with the modifier. Typical polyols which can be employed include ethylene glycol, diethylene glycol, glycerol, polypropylene glycols, butanediol, triethanolamine, pentaerythritol, trimethylolethane, bis(4-hydroxyphenyl) methane, inositol, sorbitol, trimethylolphenol, resorcinol, pyrogallol, hydroquinone, 1,8-naphthalenediol, 2,4,6-trimethylolphenol allyl ether, cyclohexanediol, and the like.

(5) Polymerizable and polymerized compositions can be prepared from admixtures which comprise (a) an epoxy-fatty acid ester comprising the products of reaction of a polyepoxide containing at least two cyclohexene oxide groups with an aliphatic monocarboxylic acid in an amount sufficient to provide between about 0.3 and 0.7 carboxyl equivalents per epoxy equivalent, and (b) a compound containing two or more epoxide groups in an amount sufficient to provide between 0.2 and 4.0 epoxy equivalents per hydroxyl equivalent of said epoxy-fatty acid ester. Suitable epoxides include the diglycidyl ether of bisphenol A, diglycidyl ether, butadiene dioxide, vinylcyclohexene dioxide, soybean oil, epoxide, divinylbenzene dioxide, bis(2,3-epoxycyclopentyl) ether, dicyclopentadiene dioxide, the polyepoxides from which the epoxy-fatty acid esters of this invention are prepared, and the like.

(6) Polymerizable and polymerized compositions can be prepared from admixtures which comprise (a) an epoxy-fatty acid ester comprising the products of reaction of a polyepoxide containing at least two cyclohexene oxide groups with an aliphatic monocarboxylic acid in an amount sufficient to provide between about 0.3 and 0.7 carboxyl equivalents per epoxy equivalent, (b) a polycarboxylic acid such as those illustrated in section (2) above in an amount sufficient to provide between 0.3 and 3.0 carboxyl equivalents per epoxy equivalent of said epoxy-fatty acid ester. A polyol of the type exemplified in section (4) above can be employed to further modify the compositions. In these admixtures, the polycarboxylic acid is a major component as compared with the polyol modifier.

(7) Polymerizable and polymerized compositions can be prepared from admixtures which comprise (a) an epoxy-fatty acid ester comprising the products of reaction of a polyepoxide containing at least two cyclohexene oxide groups with an aliphatic monocarboxylic acid in an amount sufficient to provide between about 0.3 and 0.7 carboxyl equivalents per epoxy equivalent, and (b) a polyisocyanate, i.e., an organic compound having at least two isocyanate (—NCO) groups, in an amount sufficient to provide between 0.2 and 4.0 isocyanate equivalents per hydroxyl equivalent of said epoxy-fatty acid ester.

(8) Polymerizable and polymerized compositions can be prepared from admixtures comprising (a) an epoxy-fatty acid ester adduct comprising the products of reaction of a polyepoxide containing at least two cyclohexene oxide groups with an aliphatic monocarboxylic acid in an amount sufficient to provide between about 0.3 and 0.7 carboxy equivalents per epoxy equivalent, and (b) any one of the following classes of compounds, namely, polythiols such as the sulfur analogs of the polyols listed in section (4) above, phenol-aldehyde condensates, urea-aldehyde condensates, melamine-aldehyde condensates, polyamides, polycarboxylic acid halides, and the like.

It is often advantageous to treat the polymerized esters of this invention in various ways to give products which have viscosities which do not change (become lower) on aging. Both physical and chemical treatments have been found effective. For example, heating the polymerized products at 130° C. to 250° C. for from a few minutes to several hours serves to lower the product viscosity or change a gel type structure to a free-flowing solution. Chemical treatments which serve to accomplish this same effect involve the addition of water, alcohols, acids, amines and the like to the polymerized products. Simultaneous treatment with heat and reactive compounds is often found advantageous.

It is believed that many of the polymerization catalysts utilized in the practice of this invention form both chemical and/or coordination bonds with the polymers formed to give products which are extremely viscous or are gel type structures prior to treatment as described above. Catalysts producing such effects include stannic chloride, stannic bromide, boron trifluoride-ethyl ether complex, and the like.

The preferred resinous compositions of this invention form excellent protective coatings and have several advantages over commercial epoxy varnishes and similar materials based on conventional epoxy derivatives. The improved coatings have excellent adhesion to a variety of substrates, and have excellent toughness, flexibility, caustic resistance, water resistance, chemical resistance, extreme hardness, and excellent color stability on exposure to ultra-violet light. The coatings derived from the compositions of this invention have Sward hardness values between about 50 and 80, while coatings from commercial drying oil compositions have Sward values below about 40.

The cured resinous compositions display a wide range of compatibility with other resinous materials used in protective coatings. The resinous compositions have the further advantage of being soluble in inexpensive aliphatic solvents as compared to the low tolerance of commercial epoxy varnishes for such solvents. The outstanding color stability of the resinous compositions is believed to be due to the use of polyepoxides free of phenolic nuclei which presumably form color bodies due to oxidation in the presence of heat or ultraviolet light.

The following examples will serve to illustrate specific embodiments of the invention.

The polyepoxides were prepared from the corresponding polyolefins and peracetic acid using standard procedures. The ratios of polyepoxide and fatty acids used for preparing the epoxy-fatty acid esters were based on epoxy equivalent weights as determined by analysis of the polyepoxide with pyridine hydrochloride. For example, a diepoxide having a theoretical molecular weight of 280 and which analyzes 95 percent pure would have an epoxy equivalent weight of $280 \div 2 \times 0.95 = 147$. Proportions expressed as percent (%) are in all cases weight percent.

The term "acid number" is defined as the number of milligrams of potassium hydroxide which are required to neutralize the free acid in a gram of substance. The "acid numbers" were determined by dissolving the sample for analysis in acetone and titrating with a standard alcoholic potassium hydroxide solution using phenolphthalein as the indicator. When a solvent was present with the reaction mixture being analyzed, the acid numbers reported were for the reaction mixture only and a correction was made so as not to include the solvent.

The polyepoxide-fatty acid adducts were prepared by reacting the polyepoxide and fatty acid in a round-bottomed flask fitted with an air stirrer, a thermometer, a nitrogen purge line, a water-cooled reflux condenser and being heated with an electric heating mantle. The reactions were followed by analysis for acid and when the reactions were completed analysis for residual epoxide was carried out.

Polymerization of the resulting adducts was generally carried out in solution with solvent being added as the polymerization progressed in order to maintain adequate stirring. Polymerization was considered completed when the viscosity of the reaction mixture ceased to increase as determined relatively by drawing a sample of the polymer solution into a 10 milliliter pipette and observing with a stopwatch the time required for the sample to flow from the pipette.

After the polymerizations were completed the viscosities of the products were determined at room temperature using a Brookfield viscometer, Model LVF or model LVT. Total solids present in the polymer solutions were determined by weighing about a one-gram sample of the solution into an aluminum weighing dish measuring about two inches in diameter, heating the open dish in a mechanically convected oven at 160° C. for about fifteen minutes, cooling it to room temperature and weighing the residue.

The evaluation of the various polymers as baked protective coatings generally involved the following procedure:

(1) The solution viscosity was adjusted by the addition of xylene to allow the preparation of films having a thickness of from 1.2 to 1.8 mils (thousandths of an inch).

(2) Cobalt octanoate, 0.005 percent as cobalt, was then added to serve as a drier.

(3) Films were applied by dipping Parkerized steel panels with a Fisher-Payne Dip-Coater.

(4) The resulting coated panels were air-dried for fifteen to thirty minutes and subsequently baked for thirty minutes at 177° C.

(5) A coating which gave a dry film of 1.0 to 2.0 mils in thickness was also applied to a glass plate to be used for obtaining Sward hardness values.

(6) The resulting coatings were then tested for flexibility with a Parlin-duPont Impact Tester, results reported as in./lbs.

(7) Coated panels were tested in boiling water for one hour. The following ratings were used: Excellent—unaffected except for a slight loss of gloss at the air-water interface; good—some softening at the air-water interface; fair—definitely tacky at air-water interface.

(8) Coated panels were tested for caustic resistance by immersion in 20 percent sodium hydroxide for twenty-four hours at room temperature. The following ratings were used: Excellent—no change; good—very slight softening; fair—in addition to softening, some loss of gloss and adhesion was observed; poor—film was dissolved.

The dehydrated castor oil acid employed was a commercial fatty acid designated as Baker acid 9–11 (Baker Castor Oil Company, Bayonne, New Jersey). Commercial dehydrated castor oil acid has an approximate composition of 7 to 10 percent oleic acid, 76 to 88 percent linoleic acid and 3 to 8 percent ricinoleic acid, and an iodine number of 145–155 and an equivalent weight of 284–288. Tung oil acid has an approximate composition of 4 percent palmitic acid, 1 percent stearic acid, 8 percent oleic acid, 4 percent linoleic acid, 3 percent linolenic acid and 80 percent eleostearic acid, and has an iodine number of 160–175. The approximate composition and constants of soya oil acid, tall oil acid and other commercial fatty acids are published in the chemical literature (e.g., "Epon Resin Esters," Technical Publication SC:54-46, Shell, pages 48 and 49).

EXAMPLES 1 THROUGH 4

*Preparation of epoxy-fatty acid esters*

Polyepoxide A[1] of 91.5 percent purity was reacted with dehydrated castor oil acid (DCO acid) in various ratios in the manner described above. The pertinent data are contained in the following table:

TABLE I

| Ex. No. | DCO acid grams [2] | Ratio [3] | Reaction time at 180° C., hours | Acid No. | Residual epoxide [4] | Viscosity at 25° C. cps. |
|---|---|---|---|---|---|---|
| 1 | 100 | 0.35 | 1.1 | 0.2 | 1.87 | 19,450 |
| 2 | 114 | 0.40 | 0.7 | 0.4 | 1.64 | 38,000 |
| 3 | 129 | 0.45 | 0.8 | 0.3 | 1.32 | 21,700 |
| 4 | 143 | 0.50 | 0.8 | 0.3 | 1.22 | 21,000 |

[1] 3,4-epoxy-6-methylcyclohexylmethyl 3,4-epoxy-6-methylcyclohexanecarboxylate.
[2] Per 153 grams of polyepoxide A.
[3] Ratio of carboxyl group per epoxy group.
[4] Milliequivalent per gram of epoxy-fatty acid ester product.

EXAMPLES 5 THROUGH 9

Polyepoxide A[1] of 91.5 percent purity and tung oil acid (TO acid) were reacted in various proportions in the manner previously described. The following table contains the pertinent data.

TABLE II

| Ex. No. | Epoxide [1] Grams | TO acid, grams | Ratio [2] | Reaction time at 180° C., hrs. | Acid No. | Residual epoxide [3] | Ester viscosity at 25° C., cps. |
|---|---|---|---|---|---|---|---|
| 5 | 154 | 127 | 0.40 | 0.70 | 0.4 | 1.53 | 2,400 |
| 6 | 154 | 159 | 0.50 | 1.70 | 0.4 | 0.48 | 16,400 |
| 7 | 154 | 175 | 0.55 | 2.30 | 0.4 | 0.71 | 10,800 |
| 8 | 154 | 191 | 0.60 | 3.50 | 0.3 | 0.52 | 35,200 |
| 9 | 154 | 207 | 0.65 | 1.50 | 2.7 | 0.497 | 18,400 |

[1] 3,4-epoxy-6-methylcyclohexylmethyl 3,4-epoxy-6-methylcyclohexanecarboxylate.
[2] Ratio of carboxyl group per epoxy group.
[3] Milliequivalents per gram of epoxy-fatty acid ester product.

EXAMPLES 10 THROUGH 13

Various polyepoxides and dehydrated castor oil acid were condensed in the manner previously described. The pertinent data are contained in the following table:

TABLE III

| Ex. No. | Polyepoxide | Grams | DCO acid, Grams | Ratio [1] | Reaction time and temperature Hours | Reaction time and temperature °C. | Acid No. | Residual epoxide [2] | Viscosity cps., 25° C. |
|---|---|---|---|---|---|---|---|---|---|
| 10 | B[3] | 139 | 143 | 0.5 | 2.5 | 170–200 | 0.9 | 0.86 | 34,000 |
| 11 | C[4] | 236 | 114 | 0.4 | 1.0 | 170–190 | 0.3 | 1.32 | 9,600 |
| 12 | D[5] | 250 | 166 | 0.5 | 2.5 | 170–250 | 0.1 | 0.95 | 30,000 |
| 13 | E[6] | 207 | 114 | 0.4 | 1.2 | 170–183 | 0.3 | 1.54 | 11,000 |

[1] Ratio of carboxyl group per epoxy group.
[2] Milliequivalents per gram of epoxy-fatty acid ester product.
[3] 3,4-Epoxycyclohexylmethyl 3,4-epoxycyclohexanecarboxylate.
[4] Bis(3,4-epoxy-6-methylcyclohexylmethyl) adipate.
[5] 1,1,1-Trimethylolpropane tris(3,4-epoxycyclohexanecarboxylate).
[6] 2-Ethyl-1,3-hexanediol bis-(3,4-epoxycyclohexanecarboxylate).

EXAMPLES 14 THROUGH 16

Polyepoxide A ([1]) and various fatty acids were condensed in the manner previously described. The pertinent data are contained in the following table:

TABLE IV

| Ex. No. | Epoxide grams [1] | Fatty acid | Grams | Ratio [2] | Reaction time and temperature | | Ester | | |
|---|---|---|---|---|---|---|---|---|---|
| | | | | | Hours | °C. | Acid No. | Residual epoxide [3] | Viscosity cps. at 25°C. |
| 14 | 154 | Lauric | 82 | 0.4 | 0.7 | 170–205 | 0.2 | 1.54 | 42,400 |
| 15 | 154 | Soya oil | 111 | 0.4 | 1.5 | 165–180 | 0.3 | | |
| 16 | 154 | Tall oil | 115 | 0.4 | 1.2 | 175–210 | 0.3 | 1.84 | 12,000 |

[1] 3,4-epoxy-6-methylcyclohexylmethyl 3,4-epoxy-6-methylcyclohexanecarboxylate.
[2] Ratio of carboxyl group per epoxy group.
[3] Milliequivalents per gram of epoxy-fatty acid ester product.

EXAMPLES 17 THROUGH 32

Polymerization of epoxy-fatty acid esters

The epoxy-fatty acid esters described in Examples 1 through 16 where charged to a round-bottomed flask fitted with an air stirrer, a nitrogen purge line, a thermometer and a dropping funnel. Sufficient xylene solvent was added to give a 90 percent solution which was heated to a temperature of 50° C. to 60° C. The amount of stannic chloride catalyst (weight percent based on the weight of the epoxy-ester) indicated in Table V below was mixed, as a 5 percent solution in ethyl acetate, with sufficient xylene to give a polymerization solution containing 75 percent solids. The catalyst solution was then added dropwise to the epoxy-ester solution over a period of from ten to fifty-five minutes. As the polymerization progressed additional xylene was added in order to facilitate stirring. The solids content of the resulting solutions of the polymerized products were determined by weighing approximately one gram of the solutions into an aluminum weighing dish and evaporating the solvent by heating at a temperature of 160° C. for fifteen minutes. Viscosities of the solution polymers were determined at 25° C. with a Brookfield Viscometer, Model LVF or LVT.

TABLE V

| Ex. No. | Ester from Example No. | Catalyst concentration, percent | Catalyst addition minutes at 50°–60° C. | Polymerization hours at 100°–120° C. | Properties of polymer solution | |
|---|---|---|---|---|---|---|
| | | | | | Solids, percent | Viscosity at 24°–26° C. centipoises |
| 17 | 1 | 0.3 | 42 | 0.7 | 31.2 | 182 |
| 18 | 2 | 0.3 | 40 | 2.5 | 40.0 | 340 |
| 19 | 3 | 0.3 | 55 | 5.6 | 50.0 | 400 |
| 20 | 4 | 0.3 | 55 | 5.6 | 50.0 | 237 |
| 21 | 5 | 0.25 | 30 | 0.8 | 33.5 | 140 |
| 22 | 6 | 0.25 | 25 | 2.4 | 46.5 | 785 |
| 23 | 7 | 0.25 | 15 | 5.4 | 50.0 | 1,070 |
| 24 | 8 | 0.25 | 10 | 5.0 | 48.4 | 650 |
| 25 | 9 | 0.3 | 30 | 2.0 | 30.0 | 227 |
| 26 | 10 | 0.6 | 22 | 7.0 | 74.3 | 11,600 |
| 27 | 11 | 0.3 | 25 | 4.5 | 55.0 | 510 |
| 28 | 12 | 0.3 | 22 | 3.0 | 36.5 | 108 |
| 29 | 13 | 0.3 | 21 | 4.8 | 55.2 | 2,400 |
| 30 | 14 | 0.3 | 27 | 5.0 | 54.5 | 6,400 |
| 31 | 15 | 0.3 | 35 | 7.5 | 30.0 | 70 |
| 32 | 16 | 0.3 | 10 | 6.4 | 55.8 | 3,600 |

EXAMPLES 33 THROUGH 47

These examples illustrate the evaluation of baked films from varnishes based on cyclohexene oxide derivatives. Films from the various varnishes prepared in Examples 17 through 32 were applied to Parkerized steel panels in the manner described hereinabove. The pertinent data are contained in Table VI below.

TABLE VI

| Ex. No. | Varnish from Example No. | Impact test in./lbs. | Boiling water resistance | Caustic resistance | Sward hardness |
|---|---|---|---|---|---|
| 33 | 17 | 32 | Excellent | Good | 82 |
| 34 | 18 | 4 | do | do | 80 |
| 35 | 19 | 16 | do | do | 80 |
| 36 | 20 | | Good | do | 77 |
| 37 | 21 | 100 | Excellent | Excellent | 68 |
| 38 | 22 | 108 | do | do | 66 |
| 39 | 23 | 108 | do | Good | 70 |
| 40 | 24 | 88 | do | do | 72 |
| 41 | 25 | 48 | Good | do | 52 |
| 42 | 26 | 108 | do | Fair | |
| 43 | 27 | 108 | do | Poor | 31 |
| 44 | 28 | 96 | do | Good | |
| 45 | 29 | 108 | do | Poor | 46 |
| 46 | 31 | 8 | Excellent | Good | 72 |
| 47 | 32 | | Good | Poor | 58 |

EXAMPLE 48

Polyepoxide A (3,4-epoxy-6-methylcyclohexylmethyl 3,4-epoxy-6-methylcyclohexanecarboxylate, 1530 grams) of 91.5 percent purity and dehydrated castor oil acid (1110 grams) were charged to a flask fitted with an air stirrer, a thermometer, a nitrogen purge line and a water-cooled condenser. The reaction solution was heated to 180 ± 5° C. and maintained thereat for about 1.5 hours. The resulting product had a viscisoty of 28,500 centipoises at 23° C., an acid number of 0.5, and an epoxy content of 1.67 milliequivalents per gram of epoxy-fatty acid ester product.

EXAMPLES 49 THROUGH 53

134 gram portions of the epoxy-fatty acid ester prepared in Example 48 were mixed with various polyfunctional hardeners in the proportions indicated in Table VII below. The resulting reaction mixtures were heated to a temperature of 100° C. to 120° C. with stirring and maintained thereat for the indicated period of time. As the polymerization progressed xylene was added in order to maintain a stirrable viscosity.

TABLE VII

| Ex. No. | Hardener | Grams | Ratio [1] | Polymerization at 100°–120° C., hours | Polymer solution | | Cure hours at 120° C. | Coating description |
|---|---|---|---|---|---|---|---|---|
| | | | | | Percent solids | Viscosity at 26° C., cps. | | |
| 49 | Maleic anhydride | 20 | 0.9 | 12 | 24.6 | 10,500 | 1 | Hard, clear, glossy and flexible. |
| 50 | Adipic acid | 18 | 0.6 | 12 | 67.3 | 5,250 | 6 | Do. |
| 51 | Diethylenetriamine | 11 | 1.1 | 9 | 68.6 | 21,000 | 6 | Clear, glossy, flexible and soft. |
| 52 | Phthalic anhydride | 30 | 0.9 | 6 | 28.0 | 400 | 1 | Hard, clear, glossy and flexible. |
| 53 | Toluenediisocyanate. | 35 | 0.6 | 2 | 40.0 | 3,275 | 0.5 (160° C.) | Hard, pale yellow, glossy, slightly brittle. |

[1] Ratio of reactive groups from the hardener per epoxide group from the polyepoxide.

The properties of the resulting products are described in Table VII.

Black iron panels were dip-coated from the polymer solutions and allowed to air-dry overnight (twenty-two hours) after which time they were subjected to the cures indicated in the table. The flexibility of the resulting coatings was determined by bending the panels 360 degrees on ⅛ inch mandrel and in all cases except Example 53, the films remained intact.

EXAMPLE 54

This example illustrates the excellent solubility of the polymers of this invention in an aliphatic solvent. This is in contrast to the commercial varnishes derived from the polymeric glycidyl ethers of bisphenol A, which require solvents such as xylene which are more expensive and toxic.

Polyepoxide A (3,4-epoxy-6-methylcyclohexylmethyl-3,4-epoxy-6-methylcyclohexanecarboxylate, 154 grams) and dehydrated castor oil acid (116 grams) were reacted at 180° C. to 185° C. for 0.75 hour and a product was recovered which had a viscosity of 22,375 centipoises at 26° C., an acid number of 0.2, and an epoxide content of 1.6 milliequivalents per gram of epoxy-fatty acid ester.

The ester product (189 grams) was mixed with 21 grams of Apco thinner [1] and a catalyst solution consisting of 11.3 grams of a 5 percent solution of stannic chloride in ethyl acetate and 42 grams of xylene was added dropwise over a period of thirty minutes at 50° C. The reaction temperature was then raised slowly (over a period of two hours) from 50° C. to 110° C. The reaction temperature was then maintained between 110° C. and 120° C. for one hour during which time additional Apco thinner was added in order to maintain a stirrable solution. The resulting polymer solution had a solids content of 32.5 percent, a viscosity of 1050 centipoises at 24° C., and an acid number of 0.3.

EXAMPLES 55 THROUGH 57

These examples illustrate the polymerization of an epoxy-fatty acid ester with various catalysts.

100 gram portions of the epoxy-fatty acid ester prepared in Example 48 were homopolymerized with the catalysts listed in Table VIII below. The boron trifluoride-monoethylamine catalyst was added as the pure complex while the perchloric acid and zinc fluoborate catalysts were added as 5 and 40 percent solutions in water, respectively. The reaction mixtures were heated to 100° C. with stirring and maintained thereat for three hours, then the temperature was raised to 120° C. for 2.5 hours and then to 140° C. for seven hours. Xylene was added during the process of polymerization as required to maintain a stirrable viscosity.

The resulting polymers were allowed to cool to room temperature and viscosities and solids contents were determined as previously described. Black iron panels were then coated from the polymer solutions by dipping and the resulting panels were allowed to air-dry at room temperature for thirty minutes and were then baked at 160° C. for thirty minutes. In all cases there were obtained clear, glossy, hard, flexible films.

TABLE VIII

| Ex. No. | Catalyst | Percent | Properties of the polymer solution | |
|---|---|---|---|---|
| | | | Solids, percent | Viscosity at 26° C., centipoises |
| 55 | BF³-MEA | 1.0 | 34.0 | 450 |
| 56 | Perchloric acid | 0.15 | 63.6 | 3,900 |
| 57 | Zinc fluoborate | 0.3 | 64.8 | 26,000 |

[1] Aliphatic solvent obtained from Anderson Pritchard Oil Corporation of Oklahoma City, Oklahoma. B.P. range 118° C. to 143° C., specific gravity 20/20=0.7561.

EXAMPLES 58 THROUGH 67

These examples illustrate the color stability of coatings based on epoxy-fatty acid esters of this invention when exposed to ultraviolet light.

The varnishes tested were pigmented with titanium dioxide using a polymer (no volatiles) to pigment weight ratio of 3 to 2. Mixing of the pigment and varnish was accomplished by grinding in a pebble mill for about twenty-four hours. Metal driers, cobalt octanoate (0.05 percent as cobalt) and lead octanoate (0.5 percent as lead), were then added and Parkerized steel panels were dip-coated so as to give a dry film thickness of from one to two mils (thousandths of an inch). The resulting coated panels were air-dried for one week at room temperature and then exposed to ultraviolet light for two weeks. This exposure was carried out in a closed cabinet which was maintained at 60° C. with electrically heated, mechanically convected air. The test panels were placed three inches from two 40 watt (48 inches long), Westinghouse, fluorescent-type sun lamps.

For the purpose of comparison, a commercial epoxy-type varnish was also tested. The control varnish was prepared by esterifying a polymeric glycidyl ether of bisphenol A (60 parts) with dehydrated castor oil acid (40 parts) at 225° C. to 250° C. for about four hours. The glycidyl ether had a molecular weight of between 1800 and 2000. The resulting varnish had the following properties:

Non-volatiles _____ 49–51%
Solvent _____ Xylene
Viscosity (Gardner-Holdt) _____ T–V
Acid number, maximum _____ 3

TABLE IX

| Ex. No. | Varnish from Example | Color change |
|---|---|---|
| 58 | 17 | None. |
| 59 | 20 | Do. |
| 60 | 22 | Do. |
| 61 | 23 | Do. |
| 62 | 24 | Do. |
| 63 | 25 | Do. |
| 64 | 29 | Do. |
| 65 | 31 | Do. |
| 66 | 32 | Do. |
| 67 | Control | Severe yellowing after 4 days. |

EXAMPLES 68 THROUGH 70

These examples illustrate the homopolymerization of an epoxy-fatty acid ester with various catalysts.

Polyepoxide A (3,4-epoxy-6-methylcyclohexylmethyl 3,4-epoxy-6-methylcyclohexanecarboxylate, 1222 grams) and dehyrated castor oil acid (1030 grams) were reacted in the proportion of one epoxide group per 0.45 carboxyl group at a temperature of 160° C. to produce an epoxy-fatty acid ester having an acid number of 0.2 and containing 1.32 milliequivalents of residual epoxide per gram of ester.

One hundred fifty gram portions of the above ester and xylene (17 grams) were charged to 500 milliliter, round-bottomed flasks fitted with an air stirrer, a thermometer, a nitrogen purge line, a dropping funnel, and a water-cooled condenser. The esters were heated to a temperature of 100° C. and the desired catalyst solutions were added dropwise over a period of from five to thirty minutes. Initial catalyst concentrations, in all cases, were 0.6 percent based on the weight of the epoxy-fatty acid ester and the catalyst solution was diluted with enough xylene to give a polymerized product as a 75 percent solution. After reacting at 100 C. for from one to three hours, additional catalyst was added to increase the rate of polymerization. Total catalyst concentrations, total reaction times, including the time required for catalyst additions, and the properties of the resulting polymer solutions are shown in Table X.

TABLE X

| Ex. No. | Catalyst, percent [1] | Polymerization, hrs., °C. | Properties of polymer solution | |
|---|---|---|---|---|
| | | | Solids, percent | Viscosity, cps. at 25° C. |
| 68 | AlCl₃, 1.8 | 5, 100 | 50 | 56 |
| 69 | SnBr₄, 0.9 | 1, 140 6, 100 2. 8, 140 | 50 | 1,110 |
| 70 | ZnCl₂, 1.2 | 4. 5, 100 1. 2, 140 | 83. 3 | 16, 500 |

[1] Catalysts were used as 5 percent solutions in tetrahydrofuran, xylene and ethyl ether for the AlCl₃, SnBr₄ and ZnCl₂, respectively.

EXAMPLES 70 AND 71

These examples illustrate the copolymerization of an epoxy-fatty acid ester with various diepoxide hardeners.

Polyepoxide A (3,4-epoxy-6-methylcyclohexylmethyl 3,4-epoxy-6-methylcyclohexanecarboxylate, 1530 grams) and dehydrated castor oil acid (1110 grams) were reacted in the proportion of one epoxide group per 0.4 carboxyl group at a temperature of 170° C. to 190° C. for 1.8 hours to produce a product having a viscosity of 28,500 centipoises at 23° C., an acid number of 0.5, and containing 1.7 milliequivalents of epoxide per gram of ester.

Two portions, 127 grams each, of the above ester were placed in one-liter, round-bottomed flasks fitted with an air stirrer, a thermometer, a dropping funnel and a water-cooled condenser. To one flask (Example 70) there was added 73 grams of bis(3,4-epoxy-6-methylcyclohexylmethyl) adipate and to the second flask (Example 71) there was added 72 grams of diethylene glycol bis(3,4-epoxy-6-methylcyclohexanecarboxylate). The resulting adduct-diepoxide mixtures were heated to 80° C. and to each there was added dropwise a catalyst solution comprised of 0.8 gram stannic chloride and 66 grams of xylene. The catalyst additions required from twenty-five to forty minutes after which time the polymerizations were allowed to continue under the conditions indicated in Table XI. Additional xylene was added as needed in order to maintain a stirrable polymer solution. The pertinent data are shown in Table XI.

TABLE XI

| Ex. No. | Polymerization, hrs., °C. | Properties of polymer solution | |
|---|---|---|---|
| | | Solids, Percent | Viscosity, cps. at 25° C. |
| 70 | 0.25, 50 to 60 | 31. 4 | 8, 600 |
| 71 | 0.5, 80 to 100 | 32. 1 | 18, 500 |

Black iron panels were dip-coated from the above varnish solutions and allowed to air-dry for thirty minutes at 26° C. and then baked at 160° C. for thirty minutes. The resulting films were colorless, glossy, hard, tough and flexible.

EXAMPLE 72

This example illustrates the copolymerization of an epoxy-fatty acid ester with a polyol.

A portion (134 grams) of the epoxy-fatty acid ester prepared in Examples 70 and 71 was charged with glycerol (16 grams) to a one-liter, round-bottomed flask fitted with a nitrogen purge line, an air stirrer, a thermometer, a dropping funnel and a water-cooled condenser. The resulting mixture was heated to a temperature of 80° C. and a catalyst solution consisting of 0.9 gram of stannic chloride and 52 grams of xylene was added dropwise over a period of fifteen minutes. The polymerization was allowed to continue at 80° C. for three hours at which time an additional 0.9 gram of stannic chloride in 35 grams of xylene was added over a period of ten minutes. The reaction was continued for an additional 2.3 hours at 80° C. after which time there was obtained a polymer solution containing 51 percent non-volatiles and having a viscosity of 175 centipoises at 25° C.

EXAMPLE 73

This example illustrates the superior hardness of the varnishes of this invention as compared to commercial Epon varnishes.

The commercial varnish used as a control in Example 67 was applied without pigment and with only 0.005 percent cobalt (as cobalt metal) octanoate drier to a glass plate so as to give a dry film thickness of from 1.0 to 2.0 mils. The film was allowed to air-dry from from fifteen to thirty minutes after which time it was baked for thirty minutes at 177° C. The Sward hardness value on the resulting film was 33 as compared to values as high as 82 for varnishes prepared from the epoxy-fatty acid esters of this invention (see Examples 33 through 47).

What is claimed is:

1. A composition comprising the products of reaction of (1) a polyepoxide containing at least two cyclohexene oxide groups, and (2) an aliphatic monocarboxylic acid containing between three and twenty-two carbon atoms in an amount sufficient to provide between about 0.3 and 0.7 carboxyl equivalents per epoxy equivalent of said polyepoxide.

2. A polymerizable composition comprising the composition of claim 1 and a polymerization catalyst.

3. A resinous composition comprising the polymerized derivative of the composition of claim 2.

4. A composition comprising the products of reaction of (1) a polyepoxide characterized by the general formula

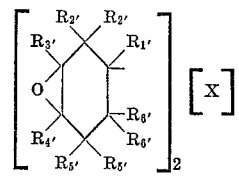

wherein X represents divalent radicals selected from the group consisting of

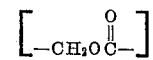

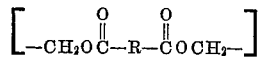

and

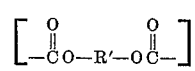

wherein R represents a member selected from the group consisting of aliphatic and aromatic radicals, R' represents an aliphatic radical, and $R_1'$ through $R_6'$ are members selected from the group consisting of hydrogen and aliphatic radicals, and (2) an aliphatic monocarboxylic acid containing between three and twenty-two carbon atoms in an amount sufficient to provide between about 0.3 and 0.7 carboxyl equivalents per epoxy equivalent of said polyepoxide.

5. A curable composition comprising the composition of claim 4 and a polymerization catalyst.

6. A resinous composition comprising the polymerized derivative of the composition of claim 5.

7. A composition comprising the products of reaction of (1) a polyepoxide characterized by the general formula

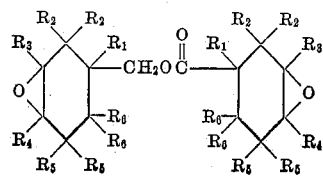

wherein $R_1$ through $R_6$ are members selected from the group consisting of hydrogen and lower alkyl radicals containing between one and four carbon atoms, and (2) an aliphatic monocarboxylic acid containing between three and twenty-two carbon atoms in an amount sufficient to provide between about 0.3 and 0.7 carboxyl equivalents per epoxy equivalent of said polyepoxide.

8. A composition comprising the products of reaction of (1) a polyepoxide characterized by the general formula

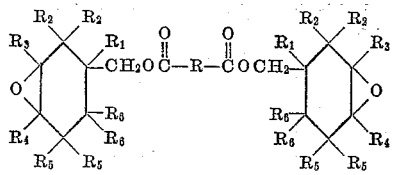

wherein R represents a member selected from the group consisting of aliphatic radicals containing between zero and about twenty carbon atoms and aromatic radicals containing between six and about twenty carbon atoms, and $R_1$ through $R_6$ are members selected from the group consisting of hydrogen and lower alkyl radicals containing between one and four carbon atoms, and (2) an aliphatic monocarboxylic acid containing between three and twenty-two carbon atoms in an amount sufficient to provide between about 0.3 and 0.7 carboxyl equivalents per epoxy equivalent of said polyepoxide.

9. A composition comprising the products of reaction of (1) a polyepoxide characterized by the general formula

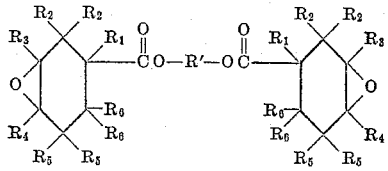

wherein R' represents an aliphatic radical containing between two and about twenty carbon atoms, and $R_1$ through $R_6$ are members selected from the group consisting of hydrogen and lower alkyl radicals containing between one and four carbon atoms, and (2) an aliphatic monocarboxylic acid containing between three and twenty-two carbon atoms in an amount sufficient to provide between about 0.3 and 0.7 carboxyl equivalents per epoxy equivalent of said polyepoxide.

10. A composition comprising the products of reaction of (1) a polyepoxide characterized by the general formula

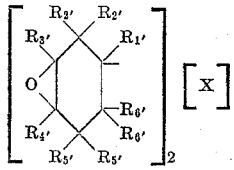

wherein X represents divalent radicals selected from the group consisting of

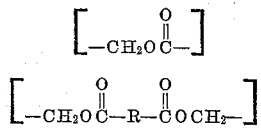

and

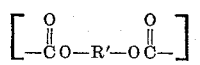

wherein R represents a member selected from the group consisting of aliphatic and aromatic radicals, R' represents an aliphatic radical, and $R_1'$ through $R_6'$ are members selected from the group consisting of hydrogen and aliphatic radicals, and (2) an aliphatic monocarboxylic acid containing between three and twenty-two carbon atoms in an amount sufficient to provide between about 0.3 and 0.7 carboxylic equivalents per epoxy equivalent of said polyepoxide, said composition having an oxirane oxygen content of at least 0.3 milliequivalent per gram of said composition.

11. A polymerizable composition comprising the composition of claim 10 and between about 0.005 and 15.0 weight percent, based on the total weight of polymerizable material, of a catalyst selected from the group consisting of acids, bases, metal halide Lewis acids and alkyl titanates.

12. A resinous composition comprising the polymerized derivative of the composition of claim 11.

13. A composition comprising material characterized by the general formula

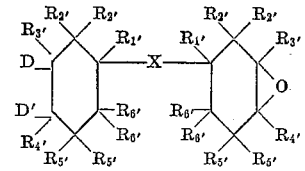

wherein X represents divalent radicals selected from the group consisting of

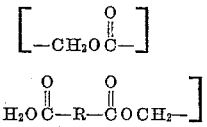

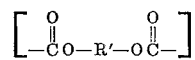

and $$\left[-\overset{O}{\underset{\|}{C}}O-R'-O\overset{O}{\underset{\|}{C}}-\right]$$

wherein R represents a member selected from the group consisting of aliphatic and aromatic radicals, R' represents an aliphatic radical, $R_1'$ through $R_6'$ are members selected from the group consisting of hydrogen and aliphatic radicals, D and D' are members selected from the group consisting of (—OH) and (ACO$_2$—) radicals with the proviso that one of said D and D' is (—OH) and the other is (ACO$_2$—), and A is an aliphatic radical containing between two and about twenty-one carbon atoms.

14. A polymerizable composition comprising the composition of claim 13 and a polymerization catalyst.

15. A resinous composition comprising the polymerized derivative of the composition of claim 14.

16. A composition comprising the products of reaction of (1) 3,4-epoxy-6-methylcyclohexylmethyl 3,4-epoxy-6-methylcyclohexanecarboxylate, and (2) dehydrated castor oil acid in an amount sufficient to provide between about 0.3 and 0.7 carboxyl equivalents per epoxy equivalent, said composition having an oxirane oxygen content of at least 0.3 milliequivalents per gram of said composition.

17. A polymerizable composition comprising the composition of claim 16 and between about 0.005 and 15.0 weight percent, based on the total weight of polymerizable material in said composition, of a catalyst selected from the group consisting of acids, bases, metal halide Lewis acids and alkyl titanates.

18. The composition of claim 17 wherein said catalyst is stannic chloride.

19. A resinous composition comprising the polymerized derivative of the composition of claim 17.

20. A synthetic drying composition comprising the composition of claim 19 dissolved in a solvent.

21. A composition comprising the products of reaction of (1) 3,4-epoxy-6-methylcyclohexylmethyl 3,4-epoxy-6-methylcyclohexanecarboxylate, and (2) tung oil acid in an amount sufficient to provide between about 0.3 and 0.7 carboxyl equivalent per epoxy equivalent, said composition having an oxirane oxygen content of at least 0.3 milliequivalent per gram of said composition.

22. A curable composition comprising the composition of claim 21 and a polymerization catalyst.

23. A resinous composition comprising the polymerized derivative of the composition of claim 22.

24. A composition comprising the products of reaction of (1) 2-ethyl-1,3-hexanediol bis-(3,4-epoxycyclohexanecarboxylate), and (2) dehydrated castor oil acid in an amount sufficient to provide between about 0.3 and 0.7 carboxyl equivalent per epoxy equivalent, said composition having an oxirane oxygen content of at least 0.3 milliequivalent per gram of said composition.

25. A polymerizable composition comprising the composition of claim 24 and a polymerization catalyst.

26. A resinous composition comprising the polymerized product of the composition of claim 25.

27. A composition comprising the products of reaction of (1) 3,4-epoxycyclohexylmethyl 3,4-epoxycyclohexanecarboxylate, and (2) dehydrated castor oil acid in an amount sufficient to provide between about 0.3 and 0.7 carboxyl equivalent per epoxy equivalent, said composition having an oxirane oxygen content of at least 0.3 milliequivalent per gram of said composition.

28. A polymerizable composition comprising the composition of claim 27 and a polymerization catalyst.

29. A resinous composition comprising the polymerized derivative of the composition of claim 28.

30. A composition comprising the products of reaction of (1) bis(3,4-epoxy-6-methylcyclohexylmethyl) adipate, and (2) dehydrated castor oil acid in an amount sufficient to provide between about 0.3 and 0.7 carboxyl equivalent per epoxy equivalent, said composition having an oxirane oxygen content of at least 0.3 milliequivalents per gram of said composition.

31. A polymerizable composition comprising the composition of claim 30 and a polymerization catalyst.

32. A resinous composition comprising the polymerized derivative of the composition of claim 31.

33. A composition comprising the products of reaction of (1) 3,4-epoxy-6-methylcyclohexylmethyl 3,4-epoxy-6-methylcyclohexanecarboxylate, and (2) lauric acid in an amount sufficient to provide between about 0.3 and 0.7 carboxyl equivalent per epoxy equivalent, said composition having an oxirane oxygen content of at least 0.3 milliequivalent per gram of said composition.

34. A polymerizable composition comprising the composition of claim 33 and a polymerization catalyst.

35. A resinous composition comprising the polymerized derivative of the composition of claim 34.

36. A composition comprising the products of reaction of (1) 1,1,1-trimethylolpropane tris-(3,4-epoxycyclohexanecarboxylate), and (2) dehydrated castor oil acid in an amount sufficient to provide between about 0.3 and 0.7 carboxyl equivalent per epoxy equivalent, said composition having an oxirane oxygen content of at least 0.3 milliequivalent per gram of said composition.

37. A polymerizable composition comprising the composition of claim 36 and a polymerization catalyst.

38. A resinous composition comprising the polymerized derivative of the composition of claim 37.

39. A composition comprising the products of reaction of (1) 3,4-epoxy-6-methylcyclohexylmethyl 3,4-epoxy-6-methylcyclohexanecarboxylate, and (2) soya oil acid in an amount sufficient to provide between about 0.3 and 0.7 carboxyl equivalent per epoxy equivalent, said composition having an oxirane oxygen content of at least 0.3 milliequivalents per gram of said composition.

40. A polymerizable composition comprising the composition of claim 39 and a polymerization catalyst.

41. A resinous composition comprising the polymerized derivative of the composition of claim 40.

42. A composition comprising the products of reaction of (1) 3,4-epoxy-6-methylcyclohexylmethyl 3,4-epoxy-6-methylcyclohexanecarboxylate, and (2) tall oil acid in an amount sufficient to provide between about 0.3 and 0.7 carboxyl equivalents per epoxy equivalent, said composition having an oxirane oxygen content of at least 0.3 milliequivalent per gram of said composition.

43. A polymerizable composition comprising the composition of claim 42 and a polymerization catalyst.

44. A resinous composition comprising the polymerized derivative of the composition of claim 43.

45. A process for producing epoxy-fatty acid esters which comprises interacting at a temperature in the range between about 25° C. and 250° C. a polyepoxide containing at least two cyclohexene oxide groups with an aliphatic monocarboxylic acid containing between three and twenty-two carbon atoms in an amount sufficient to provide between about 0.3 and 0.7 carboxyl equivalent per epoxy equivalent of said polyepoxide.

References Cited in the file of this patent

UNITED STATES PATENTS

| | | |
|---|---|---|
| 2,716,123 | Frostick et al. | Aug. 23, 1955 |
| 2,745,847 | Phillips et al. | May 15, 1956 |
| 2,750,395 | Phillips et al. | June 12, 1956 |
| 2,759,901 | Greenlee | Aug. 21, 1956 |
| 2,857,402 | Phillips et al. | Oct. 21, 1958 |
| 2,890,209 | Phillips et al. | June 9, 1959 |

UNITED STATES PATENT OFFICE
CERTIFICATE OF CORRECTION

Patent No. 2,999,827                          September 12, 1961

Charles W. McGary, Jr., et al.

It is hereby certified that error appears in the above numbered patent requiring correction and that the said Letters Patent should read as corrected below.

Column 16, line 42, TABLE II, under the heading, "Residual epoxide", line 2, for "0.48" read -- 0.84 --; column 22, line 15, for "from", first occurrence, read -- for --.

Signed and sealed this 24th day of April 1962.

(SEAL)
Attest:

ESTON G. JOHNSON                             DAVID L. LADD
Attesting Officer                              Commissioner of Patents